United States Patent
Larson et al.

(10) Patent No.: US 10,459,224 B2
(45) Date of Patent: Oct. 29, 2019

(54) HIGH TRANSMITTANCE EYEWEAR FOR HEAD-UP DISPLAYS

(71) Applicant: HONEYWELL INTERNATIONAL INC., Morristown, NJ (US)

(72) Inventors: Brent D. Larson, Phoenix, AZ (US); Kanghua Lu, Phoenix, AZ (US); Kalluri R. Sarma, Mesa, AZ (US)

(73) Assignee: HONEYWELL INTERNATIONAL INC., Morris Plains, NJ (US)

( * ) Notice: Subject to any disclaimer, the term of this patent is extended or adjusted under 35 U.S.C. 154(b) by 0 days.

(21) Appl. No.: 14/499,626

(22) Filed: Sep. 29, 2014

(65) Prior Publication Data

US 2016/0091715 A1  Mar. 31, 2016

(51) Int. Cl.
| | |
|---|---|
| *G02B 27/01* | (2006.01) |
| *H04N 13/194* | (2018.01) |
| *H04N 13/344* | (2018.01) |
| *H04N 13/398* | (2018.01) |
| *G02B 27/22* | (2018.01) |
| *G02B 27/00* | (2006.01) |

(52) U.S. Cl.
CPC ..... *G02B 27/0101* (2013.01); *G02B 27/0093* (2013.01); *G02B 27/01* (2013.01); *G02B 27/2228* (2013.01); *G02B 27/2264* (2013.01); *H04N 13/194* (2018.05); *H04N 13/344* (2018.05); *H04N 13/398* (2018.05); *G02B 2027/011* (2013.01); *G02B 2027/014* (2013.01); *G02B 2027/0134* (2013.01); *G02B 2027/0141* (2013.01)

(58) Field of Classification Search
CPC ............ G02B 27/0101; G02B 27/0093; G02B 27/01; G02B 27/2228; G02B 27/2264; H04N 13/0059; H04N 13/044; H04N 13/0497
USPC .......................................................... 348/53
See application file for complete search history.

(56) References Cited

U.S. PATENT DOCUMENTS

| | | |
|---|---|---|
| 4,723,160 A | 2/1988 | Connelly |
| 5,552,935 A | 9/1996 | Knoll et al. |
| 5,731,902 A | 3/1998 | Williams et al. |
| (Continued) | | |

FOREIGN PATENT DOCUMENTS

| | | |
|---|---|---|
| CN | 1732404 A | 2/2006 |
| CN | 101876750 A | 11/2010 |
| (Continued) | | |

OTHER PUBLICATIONS

EP Search Report for Application No. 15187006.0-1504 / 3001236 dated May 24, 2016.

(Continued)

*Primary Examiner* — Ayman A Abaza
(74) *Attorney, Agent, or Firm* — Lorenz & Kopf, LLP

(57) ABSTRACT

A system and method of displaying a conformal-capable head-up display image is provided. Distortions caused by combiner curvature, for example, are removed by pre-distorting and projecting separate images for each eye. Shutter-based eyewear controls the visibility as the imagery is cycled, e.g., shuttered, between left and right eyes. The combined image generator, projector and eyewear system maintains minimal vergence errors, minimal dipvergence errors, acceptable average transmittance, and optionally, high conformality.

22 Claims, 8 Drawing Sheets

(56) References Cited

U.S. PATENT DOCUMENTS

| | | | |
|---|---|---|---|
| 5,805,119 A | 9/1998 | Erskine et al. | |
| 6,057,811 A * | 5/2000 | Edwards | G02B 27/2264 345/8 |
| 6,473,240 B1 | 10/2002 | Dehmlow | |
| 6,532,008 B1 * | 3/2003 | Guralnick | G02B 27/2264 345/419 |
| 6,750,832 B1 | 6/2004 | Kleinschmidt | |
| 6,952,312 B2 | 10/2005 | Weber et al. | |
| 7,123,418 B2 | 10/2006 | Weber et al. | |
| 7,203,005 B2 | 4/2007 | Jiang et al. | |
| 8,023,052 B1 * | 9/2011 | Osterman | G02F 1/13471 349/15 |
| 8,184,215 B2 | 5/2012 | Osterman et al. | |
| 8,422,112 B2 | 4/2013 | Li et al. | |
| 8,743,112 B2 | 6/2014 | Woo | |
| 8,912,978 B2 | 12/2014 | Szczerba et al. | |
| 9,137,510 B2 | 9/2015 | Myungsoo et al. | |
| 9,606,355 B2 | 3/2017 | Larson et al. | |
| 2002/0089756 A1 | 7/2002 | Aoki et al. | |
| 2004/0061819 A1 | 4/2004 | Faris et al. | |
| 2004/0135742 A1 | 7/2004 | Weber et al. | |
| 2006/0238877 A1 | 10/2006 | Ashkenazi et al. | |
| 2008/0062259 A1 * | 3/2008 | Lipton | H04N 13/0434 348/58 |
| 2009/0034087 A1 | 2/2009 | Hung et al. | |
| 2009/0128901 A1 * | 5/2009 | Tilleman | G02B 26/10 359/475 |
| 2009/0278765 A1 * | 11/2009 | Stringfellow | G02B 27/01 345/7 |
| 2010/0091027 A1 | 4/2010 | Oyama et al. | |
| 2010/0092784 A1 | 4/2010 | Kamada et al. | |
| 2011/0234777 A1 * | 9/2011 | Kobayashi | G02B 27/2264 348/56 |
| 2012/0127381 A1 | 5/2012 | Lvovskiy et al. | |
| 2012/0139817 A1 | 6/2012 | Freeman | |
| 2013/0038803 A1 * | 2/2013 | Ma | G02F 1/133711 349/15 |
| 2013/0106832 A1 | 5/2013 | Meeker et al. | |
| 2013/0182320 A1 | 7/2013 | Silverstein | |
| 2014/0333510 A1 * | 11/2014 | Wischmeyer | B64D 43/00 345/8 |
| 2014/0347570 A1 * | 11/2014 | Osterman | G02F 1/0136 349/2 |
| 2015/0022646 A1 | 1/2015 | Brooks | |
| 2015/0070742 A1 * | 3/2015 | Sorek | G02B 5/20 359/238 |

FOREIGN PATENT DOCUMENTS

| | | | |
|---|---|---|---|
| CN | 102141686 A | 8/2011 | |
| CN | 202141854 U | 2/2012 | |
| CN | 102457755 A | 5/2012 | |
| CN | 102725682 A | 10/2012 | |
| CN | 102736249 A | 10/2012 | |
| CN | 102883177 B | 11/2014 | |
| DE | 20304399 U1 | 6/2003 | |
| DE | 102009054232 A1 | 5/2011 | |
| EP | 0170523 A2 | 2/1986 | |
| EP | 0296710 A2 | 12/1988 | |
| EP | 0946893 B1 | 4/2002 | |
| EP | 2355530 A2 * | 8/2011 | G02B 27/2264 |
| FR | 2860601 A1 | 4/2005 | |
| JP | 5075776 B2 | 11/2012 | |
| WO | 03102666 A1 | 12/2003 | |
| WO | 2006128862 A1 | 12/2006 | |
| WO | 2007/084267 A2 | 7/2007 | |

OTHER PUBLICATIONS

USPTO Office Action for U.S. Appl. No. 14/499,812; Notification dated May 5, 2016.
EP Partial Search Report for Application No. EP 15187006.0 dated Feb. 16, 2016.
EP Search Report for Application No. 14193519.7 dated Apr. 8, 2015.
USPTO Office Action, dated May 5, 2015; U.S. Appl. No. 14/102,950.
EP Extended Search Report for Application No. 15186765.2 dated Jan. 29, 2016.
USPTO Notice of Allowance, dated Aug. 31, 2015; U.S. Appl. No. 14/102,950.
USPTO Notice of Allowance for U.S. Appl. No. 14/499,812 dated Nov. 18, 2016.
USPTO Office Action for U.S. Appl. No. 15/469,104 dated May 31, 2018.
Chinese Office Action for Application No. 201410749787.1 dated Mar. 2, 2018.
Chinese Office Action for Application No. 201410749787.1 dated Sep. 14, 2018.
USPTO Final Office for U.S. Appl. No. 15/469,104 dated Jan. 11, 2019.
Chinese Office Action in Application No. 201510925061.3 dated Feb. 2, 2019.
Chinese Office Action in Application No. 201510915893.7 dated Feb. 2, 2019.
EP Exam Report for Application No. 14193519.7 dated Nov. 6, 2018.

* cited by examiner

HIGH TRANSMITTANCE EYEWEAR FOR HEAD-UP DISPLAYS

TECHNICAL FIELD

The present invention generally relates to high transmittance eyewear, and more particularly relates to high transmittance eyewear that may be used in head-up displays (HUDs).

BACKGROUND

Head-up displays (HUDs) are becoming increasingly popular in the aerospace industry. Known HUDs typically include at least a projector, a combiner, and an image generator. The projector receives images supplied from the image generator, and the HUD will typically include an optical collimator, such as a convex lens or concave mirror, to produce an image that is perceived to be at or near infinity.

The combiner reflects the image projected by the projector in such a way as to see the field of view and the projected infinity image at the same time. The combiner is typically a very precisely designed and controlled optical element and may be flat or curved. Some combiners may also have special coatings that reflect certain wavelengths of light projected onto it from the projector while allowing all other wavelengths of light to pass through.

Traditional prior art HUDs typically rely on sophisticated optics to meet the performance requirements for avionic use. These performance requirements include precise angular control and uniformity over an exit pupil or head box that is large enough to encompass both eyes of a pilot or other user. As an example, the size, weight and cost of a bulky overhead unit (OHU) may be driven to a large extent by the required performance levels.

One known HUD, described in U.S. application Ser. No. 14/102,950 assigned to the assignee of the present invention, provides separately corrected images to each eye by forming separate eyeboxes for the right eye and the left eye.

Hence, there is a need for a HUD that does not rely upon sophisticated optics to meet the performance requirements needed for use in avionics environments. The present invention addresses at least this need. Furthermore, other desirable features and characteristics of the exemplary embodiments will become apparent from the subsequent detailed description and the appended claims, taken in conjunction with the accompanying drawings and the foregoing technical field and background.

BRIEF SUMMARY

An optical device, e.g., eyewear, and a method provide separate images through high transmittance eyewear.

In one embodiment, an optical device configured to optically receive a right eye image and a left eye image, comprises a first lens assembly configured to cycle between absorbing the left eye image and transmitting the right eye image; and a second lens assembly configured to cycle between absorbing the right eye image and transmitting the left eye image; wherein the optical device has an average transmittance greater than 50 percent.

In another embodiment, an optical device, included within a head-up display system, comprises an image generator configured to generate a pre-distorted right eye image and a pre-distorted left eye image; a combiner positioned to reflect the pre-distorted right eye image to supply a distortion compensated right eye image to the eyebox and to reflect the pre-distorted left eye image to supply a distortion compensated left eye image to the eyebox. right eyewear configured to be cycled between absorbing and transmitting, and receiving the distortion compensated right eye image and the distortion compensated left eye image when positioned within an eyebox, and cycled to provide a right eye image during a first time period and to block the left eye image during a second time period; and left eyewear configured to be cycled between absorbing and transmitting, and receiving the distortion compensated right eye image and the distortion compensated left eye image when positioned within the eyebox, and cycled to provide a left eye image during the second time period and to block the right eye image during the first time period.

In yet another embodiment, a method of viewing a conformal-capable display image, comprising the steps of alternately projecting a pre-distorted right eye image and a pre-distorted left eye image via a projector; reflecting the pre-distorted right eye image and the pre-distorted left eye image via a combiner to provide a distortion compensated right eye image and a distortion compensated left eye image; cyclically absorbing the distortion compensated left eye image and transmitting a right eye image within an eyebox by a first lens assembly having an average transmittance greater than 50 percent; and cyclically absorbing the distortion compensated right eye image and transmitting a left eye image within an eyebox by a second lens assembly having an average transmittance greater than 50 percent.

BRIEF DESCRIPTION OF THE DRAWINGS

The present invention will hereinafter be described in conjunction with the following drawing figures, wherein like numerals denote like elements, and wherein.

DETAILED DESCRIPTION

The following detailed description is merely exemplary in nature and is not intended to limit the invention or the application and uses of the invention. As used herein, the word "exemplary" means "serving as an example, instance, or illustration." Thus, any embodiment described herein as "exemplary" is not necessarily to be construed as preferred or advantageous over other embodiments. All of the embodiments described herein are exemplary embodiments provided to enable persons skilled in the art to make or use the invention and not to limit the scope of the invention which is defined by the claims. Furthermore, there is no intention to be bound by any expressed or implied theory presented in the preceding technical field, background, brief summary, or the following detailed description.

Figure 1:
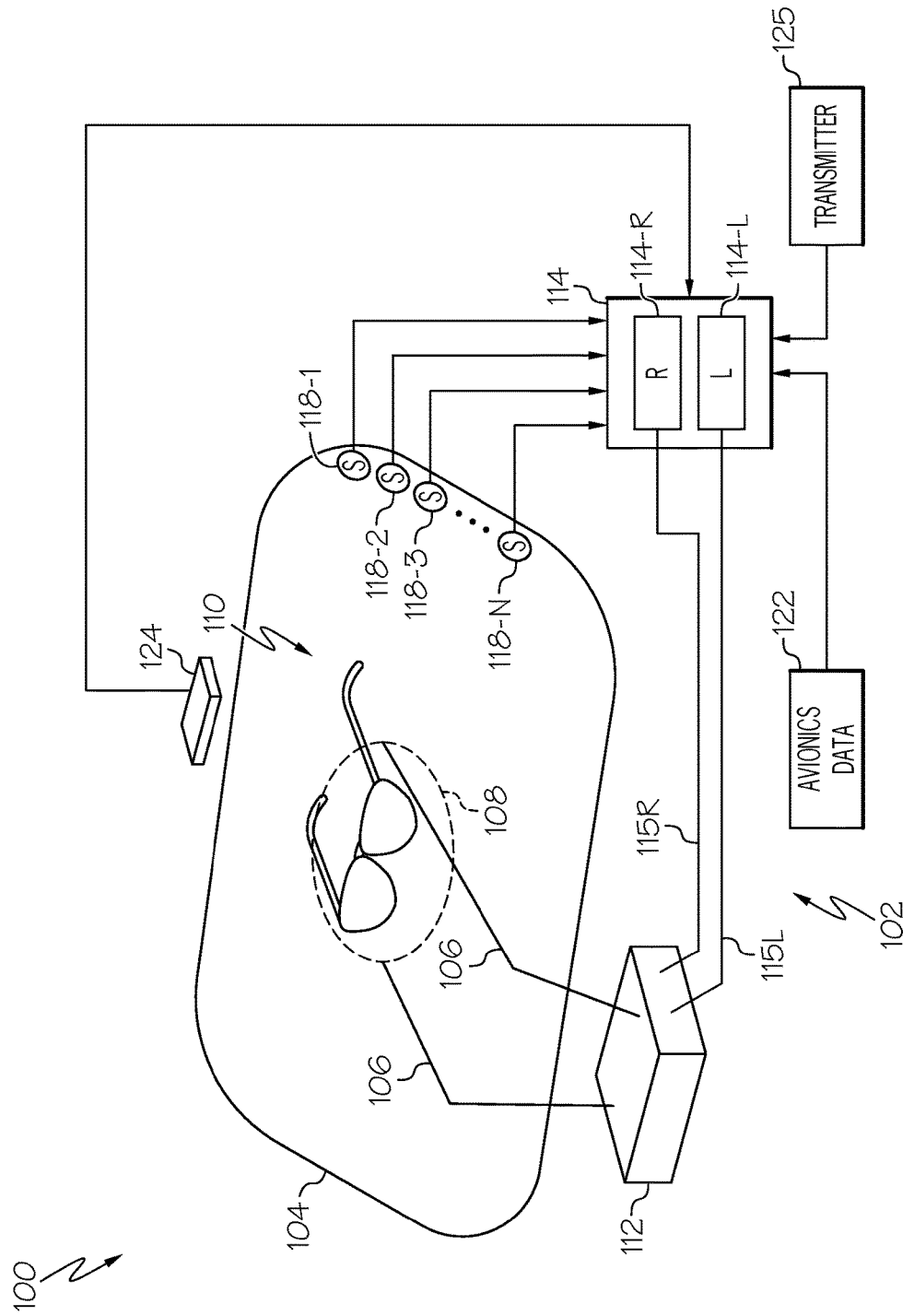
FIG. 1 is a functional block diagram of an embodiment of a conformal-capable head-up display system.

Referring to FIG. 1, a functional block diagram of one embodiment of a conformal-capable head-up display system 100 is depicted and includes a projector 102, a windscreen, or combiner, 104, shutter eyewear 110, image generators 114, sensors 118, avionics data 122, a pupil tracking system 124, and a transmitter 125. The projector 102 is configured to optically generate and alternately project a right-eye and a left-eye image 106. The windscreen 104 is positioned to receive the right-eye and the left-eye image 106, and to reflect the image 106 to an eyebox 108. Before proceeding further, it is noted that the term "eyebox" as used herein, is equivalent to the term "eye motion box." Moreover, in some embodiments, the eyebox 108 may take the form of the exit pupil of an optical system. The term "conformal-capable" as used herein indicates that the described embodiment(s) can be configured to display imagery which is substantially conformal to a forward scene observable through the windscreen or other image combiner element, although the system may also be used in non-conformal modes and applications as well as configurations with little or no see-through to an outside scene.

Other terms that could be associated with eyebox 108 include "headbox" or "head motion box". It is recognized that there are many possible detailed variations in the eyebox 108 and how it is generated. It could be a single region or composed of multiple regions, possibly overlapping. It could be large or small, static or dynamic. In the present invention, however, these are typically secondary considerations since the eyebox 108 is not relied upon for controlling the viewability versus non-viewability of right-eye and left-eye image 106 by the respective eye.

The projector 102 may be variously configured to implement its function, but in the depicted embodiment it includes a projection unit 112 and a pair of image generators 114, namely, a right-eye image generator 114-R and a left-eye image generator 114-L that generate a pre-distorted right-eye image 115-R and a pre-distorted left-eye image 115L. The projection unit 112 receives pre-distorted images 115-R, 115-L that are separately generated by each of the image generators 114, and then projects the pre-distorted images toward the windscreen 104. The pre-distorted images 115-R and 115-L will have a different degree of distortion from one another. It will be appreciated that the projection unit 112 may be variously implemented. While FIG. 1 shows two separate data paths 115-R, 115-L going to projection unit 112, one possible variation is for the right and left image data to be combined into a single data path prior to reaching projection unit 112, for example as alternating fields within a single video signal. In another exemplary embodiment, a single image generator subsystem could serve as both 114-R and 114-L. It is also noted the images 115-R, 115-L, 106 may comprise a spectrum of frequencies (color).

The optical projector 102 is preferably at least partially collimated, including the effect of the windscreen 104 or other combiner, but by applying the active pre-distortion compensation in binocular fashion the required degree of image collimation is significantly reduced.

The exemplary embodiment projects combined right and left eye HUD images 106 to the eyebox 108, and shutter-based eyewear 110 controls the visibility as the imagery is cycled between left and right channels. These separate HUD channels may be individually corrected for each eye in order to locate the perceived binocular image of each displayed feature at the desired target position for that feature. In the traditional HUD context, that desired position is likely located at optical infinity or far distance, although the system would also be capable of varying the perceived vergence, thereby making it appear closer as in a stereoscopic 3-D display.

The location of each eye, or more specifically the pupil of each eye, will be monitored in this embodiment by a pupil tracking system 124. Any of several head and/or eye tracking schemes could be used, although the simplest example might be a dual camera system. In this exemplary system, each camera and associated image analysis algorithm detects the location of each eye pupil in the respective camera image. The true spatial position of each eye is then determined via triangulation or similar analysis of the image pair. Alternatively, the eyewear could include emitters, or possibly retroreflective elements, which could simplify the pupil locating task.

The optical aberrations of the projector optics, including the windscreen 104 or other combiner, will be calibrated and/or optically monitored such that the effective distortion of the viewable image(s) are known for each pupil location. Image compensation, for example image distortion correction or pre-distortion, will be actively applied for each frame of the supplied image(s), based on the currently known eye pupil location or best estimate thereof.

By this actively compensated binocular approach, the optical requirements for each projected pupil are greatly simplified, and the use of compact and low cost optics should be practical.

Figure 2:
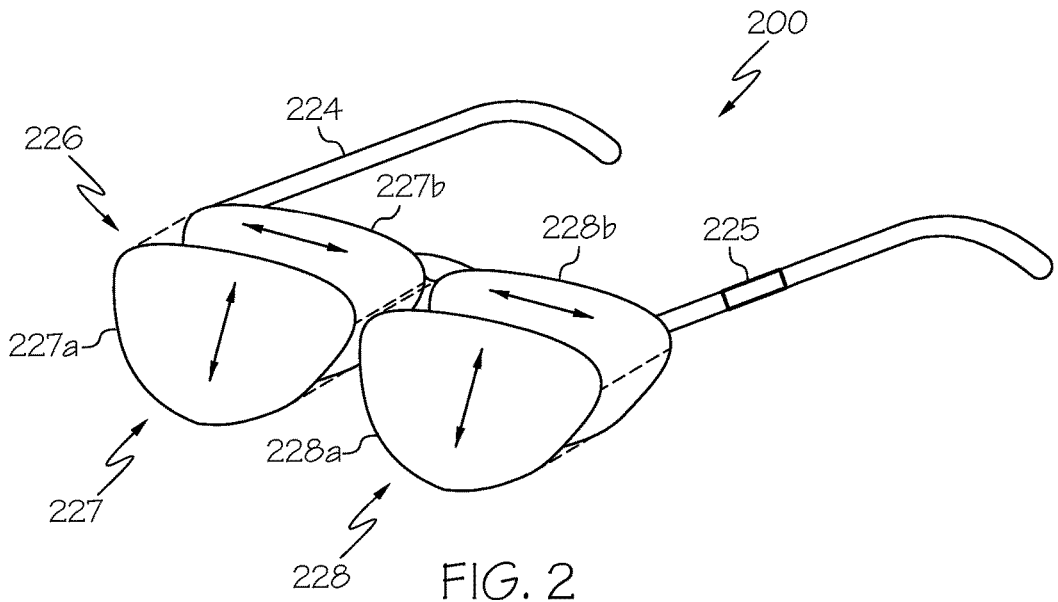
FIG. 2 is a diagram of shutter eyewear in accordance with a first exemplary embodiment.

Referring to FIG. 2 and in accordance with the present inventions, a shuttered eyewear 200 includes a frame 224 for securing a liquid crystal lens (LCL) 226, and includes a receiver 225. The LCL 226 is configured to operate in field sequential mode, and is coupled to alternately optically receive and transmit right eye and left eye images 106, respectively, that are generated by the image generators 114 and projected by the projection unit 112. The LCL 226 has its timing synchronized such that the transmitting intervals for the right eye image and the left eye image are sequenced to match the projector timing. The LCL 226 includes guest-host cells 227a and 227b for one eye (a first lens 227), and guest-host cells 228a and 228b for another eye (second lens 228).

The transmitter 125 and the receiver 225 function together, wherein the transmitter 125 transmits a timing sequence associated with the projection of left and right images to the receiver 225. While the timing sequence may be provided to the eyewear wirelessly in this exemplary embodiment, it may be provided to the eyewear 200 by any known means, including but not limited to wired connections, or the temporal encoding of synchronization signals within the light from the projection unit 112. In this latter case, the eyewear 200 would include an optical detector to monitor the signals and synchronize shutter operation to them.

The projector does not need to create individual and separate pupils for the two eyes as is disclosed in U.S. application Ser. No. 14/102,950, assigned to the Assignee of the present inventions, and further would not need to steer those projector pupils to follow the eye pupil locations. The control of visibility may be provided by the eyewear 200 having shutter functionality, similar to certain eyewear-based stereoscopic display approaches. Those approaches, however, are typically non-compliant with avionic HUD requirements as they involve polarizers which significantly reduce the eyewear transmittance to less than 50% over much or all of the visible spectrum. While certain polarizer schemes can increase that transmittance slightly, for example in the case of narrow spectral band implementations, the primary embodiment taught here utilizes a novel liquid crystal display (LCD) light shutter based on dual, crossed dichroic guest-host LCD devices 227a, 227b, 228a, 228b.

For the described embodiment, each guest-host cell 227a, 227b, 228a, 228b contains a dichroic dye (the guest) in a liquid crystal material (the host), as is well-known in the art. While many variants are known, this embodiment utilizes a mixture which is field-switchable between substantially homeotropic and substantially homogeneous or planar alignment. In the homeotropic orientation, the mixture is highly transmissive, whereas in the homogeneous orientation the mixture strongly absorbs one polarization of light but remains highly transmissive to the other polarization.

Each guest-host cell 227a, 227b, 228a, 228b can be designed to operate in either a normally clear or normally absorbing mode. For normally clear, with power off, a vertically aligned (VA) guest-host mode can be used. These are known in the art, and would typically be based upon an LC mixture having negative dielectric anisotropy with respect to the drive signal. For normally dark, a homogeneous or planar alignment can be used, for example with anti-parallel rubbing of the surface alignment layers, and with an LC mixture having positive dielectric anisotropy. Other LC modes may also be possible, including but not limited to a guest-host pi-cell, in which parallel rubbing would likely be used with a positive dielectric anisotropy LC mixture. Pi-cells are also referred to as Optically Compensated Bend (OCB) mode devices. The pi-cell LC mode (without dye), whose geometry is distinct from both the VA and the homogeneous or planar alignment geometries, is recognized for its typically fast response time characteristics, which would certainly be advantageous to reduce the required duty cycle of the dark state and thereby enable a higher average transmittance.

The configuration combines each guest-host cell 227a, 228a (essentially a switchable linear polarizer) with a second guest-host cell 227b, 228b which is rotated ninety degrees with respect to the first. In this case, the cells 227a, 227b, 228a, 228b can be made to be substantially transparent or act as crossed linear polarizers, depending upon the applied voltage(s).

By providing such a dual-cell configuration for each eye, the shutter for a particular eye, say the left eye, can be "closed" (crossed polarizers) while the image for the other eye is displayed. By temporally multiplexing right and left images, and blocking the inappropriate image for each eye, a high transmittance approach is enabled. Transmittance can be increased as needed by shortening the dark time for each dual-cell shutter, and shortening the pulsed display output (e.g., pulsed backlight for an LCD or other type of projector) to match. It is for this capability that a rapid response time device is highly desirable.

Various other embodiments are envisioned. Additional stacked devices can be incorporated, for example, including complementary devices for each polarization if intermediate gray levels are required with minimal gray level variation over view angle. Other variations could include the use of wavelength-selective dichroic dyes. The eyewear 200 could take the physical form of, for example, sunglasses, goggles, clip-on lenses, a headset. Still other embodiments could include either passive or switchable birefringent retarders between the switchable polarizers, allowing additional flexibility in the switchable polarizer orientations. The eyewear 200, which includes the liquid crystal lenses may or may not include elements or lenses having refractive power.

The eyewear 200 could be used as adjustable sunglasses, switchable between clear, non-polarized attenuation, or polarized attenuation along either axis. Eyewear 200 could also be used with other displays, such as non-see-through displays, which require shutter eyewear functionality.

While it is preferable to keep the accommodation (focus) distance of displayed conformal image(s) distant in order to minimize accommodation-vergence disparity, the disclosed shuttered eyewear approach would also enable conformal imagery to be displayed even if the alternating images would be focused at or near the windscreen, such as with a fluorescent down-converting projection screen that is otherwise transparent.

Returning now to FIG. 1, the image generators 114 generate the images associated with each eye of a viewer, such as a pilot. That is, the right eye image generator 114-R generates images associated with the right eye of a viewer, and the left eye image generator 114-L generates images associated with the left eye of a viewer. The image generators 114 individually pre-distort the generated images so that the perceived binocular image of each displayed feature is located, after reflection by the windscreen 104, at the desired target position for that feature as seen from the anticipated or preferably tracked location of the viewer's eye. Preferably the desired target position has a binocular vergence corresponding to optical infinity or far distance. In some embodiments, however, the image generators 112 may be capable of moving the target position closer, adjusting the effective vergence distance for viewing the feature by appropriately shifting the display feature in either or both of the right eye and left eye images.

Figure 4:
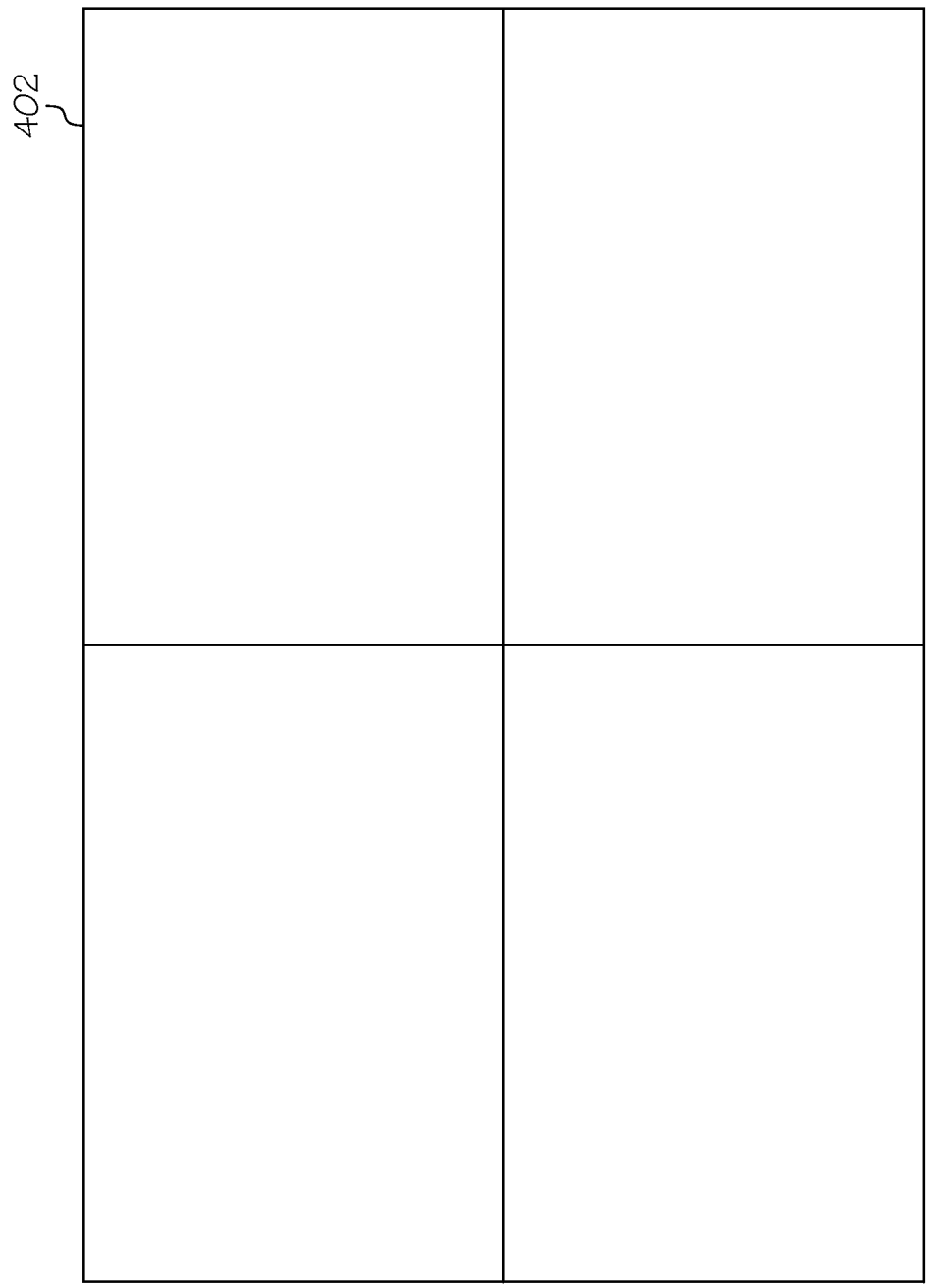
FIGS. 4 through 7 are examples of undistorted, distorted and pre-distorted image views, where pre-distortion is used to compensate the otherwise distorted image views.

To illustrate the effect of shuttering the right and left images, reference is made to FIG. 4, which depicts a single rectilinear grid 402 having perpendicular row and column lines and square corners. In the following discussion, it is assumed that this single rectilinear grid 402 is the image being supplied from the image data source 114 and projected by the projection unit 112 toward the windscreen 104. It is additionally assumed that this image is not yet pre-distorted.

Figure 5:
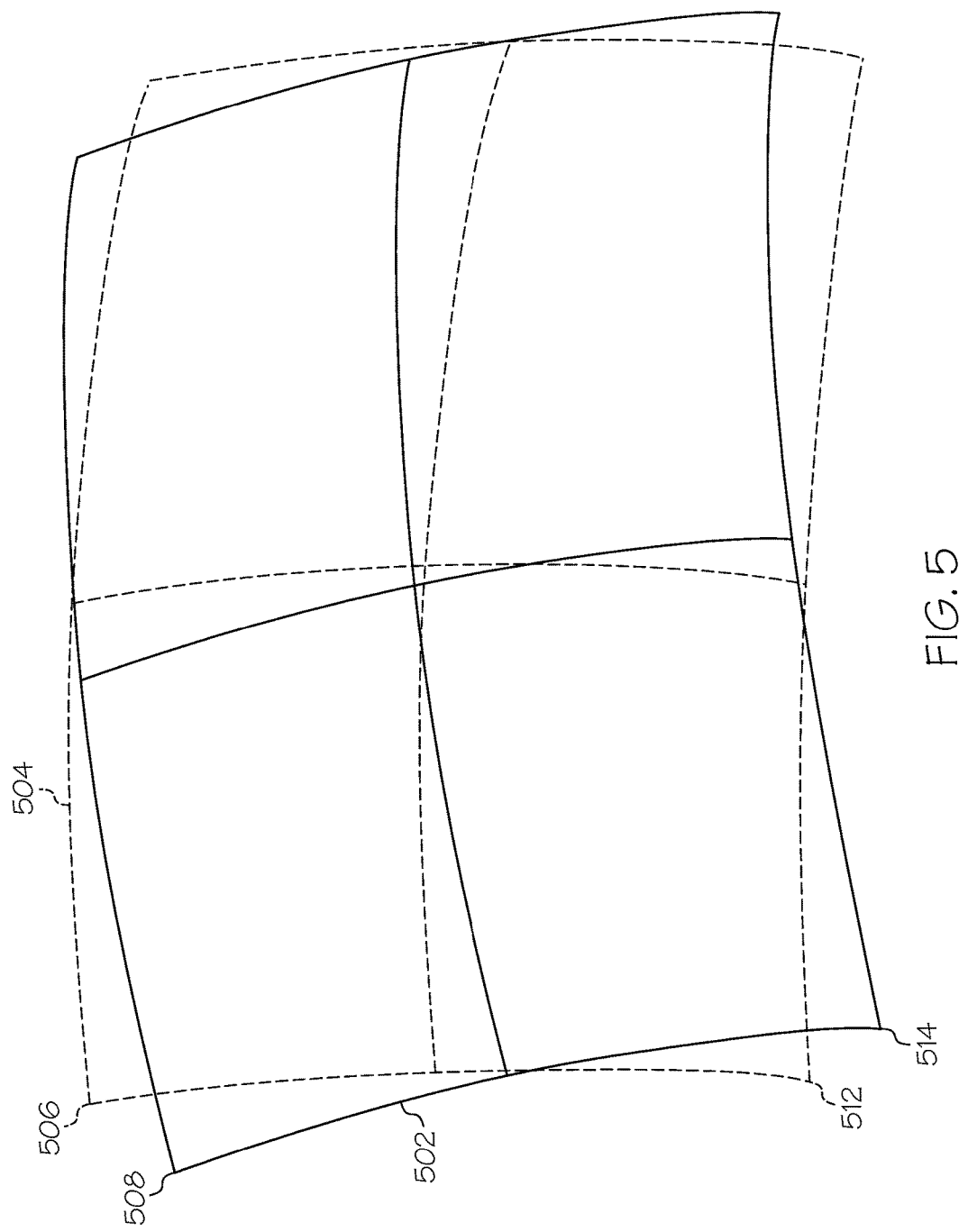

The corresponding exemplary right and left eye images reflected by the windscreen 104 to a particular set of right and left eye pupil positions (i.e., separated by the inter-pupillary distance or IPD) in the eyebox 108 are depicted in FIG. 5, and illustrate how the windscreen 104 or other combiner surface may distort the reflected images. In particular, distorted image 502 depicts how the rectilinear grid 402 may appear for the right eye, and distorted image 504 depicts how the rectilinear grid 402 may appear for the left eye. In general, the two images 502, 504 will not coincide, and several misleading visual cues may result which are strongly dependent upon the particular windscreen shape, viewing configuration and also possibly the projection unit 112 as well. The depicted combination of eyewear 200 and image generator 114 is particularly directed at minimizing vergence cues that are misleading or even uncomfortable to view. Unlike some known display systems, such as stereoscopic displays, which are configured to specifically and deliberately modify the lateral separation of right and left images (the subset of vergence cues known as convergence and the related potential divergence) to portray depth, or apparent distance from the viewer, the depicted configuration compensates that lateral separation in the presence of the image-distorting windscreen based on the specific viewing pupil locations to eliminate spurious and potentially dramatic apparent distance errors.

There are other potential visual disparities as well that are compensated by the combination of eyewear 200 and image generator 114. One particularly problematic visual anomaly with a non-symmetric windscreen reflectance profile, such as the example depicted in FIG. 5, is dipvergence, which is a vertical disparity between the views seen by the right and left eyes. Such vertical disparity is very uncomfortable to view, and is clearly present in portions of the differentially distorted binocular views depicted in FIG. 5. The example depicted in FIG. 5 additionally illustrates how both the dipvergence and the convergence can vary dramatically across the effective field of view. In particular, it is seen that the apparent upper left corner 506 seen by the left eye is both above and to the right of the corresponding corner 508 as seen by the right eye, while the geometrical relationship is quite different for the apparent lower left corners 512, 514 and the other corners as well. Other terms sometimes used in this context include cyclodisparity or cyclovergence, where a viewer will sense and attempt to adjust to differential rotation of features presented to the right and left eyes.

Figure 6:
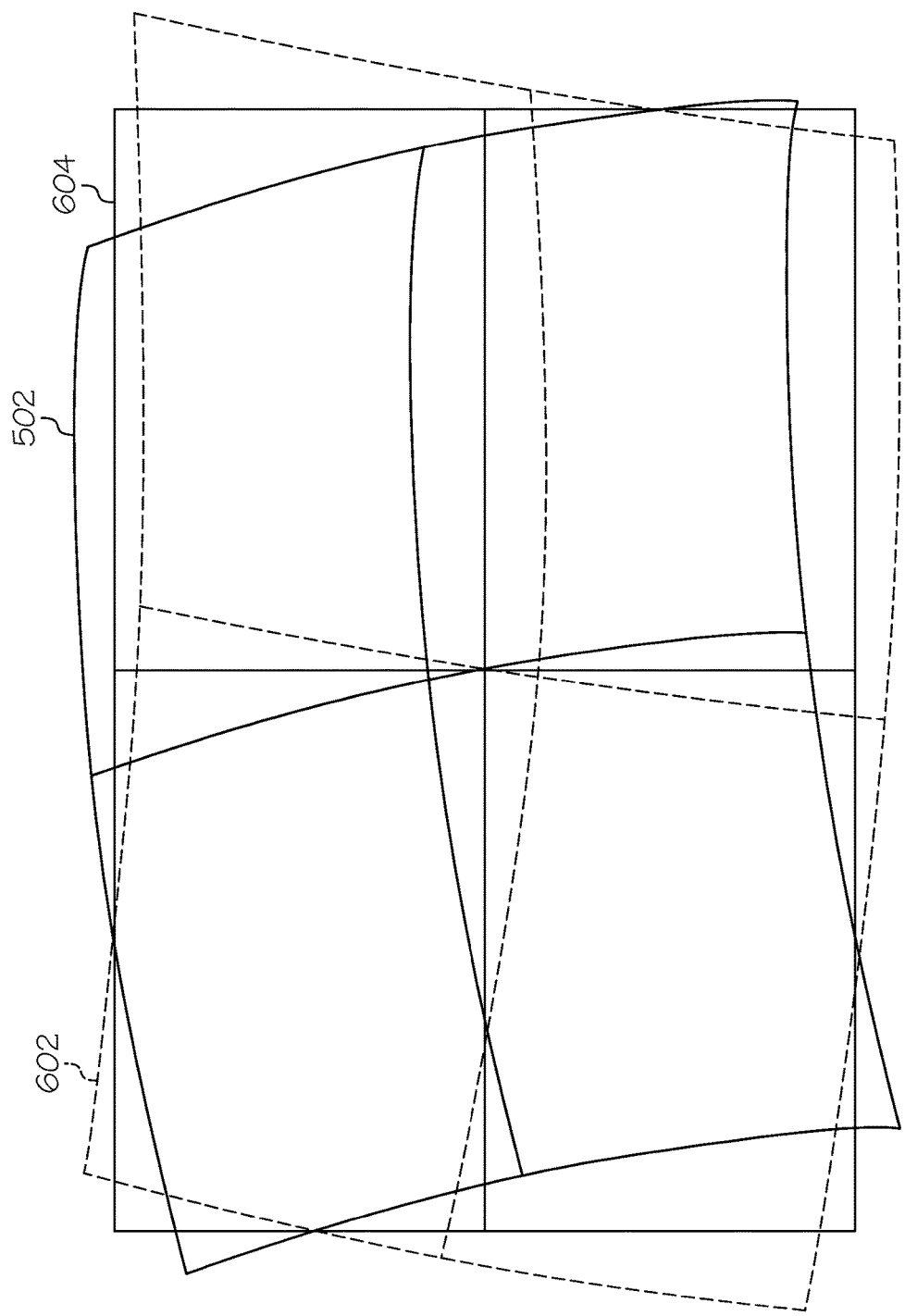
Figure 7:
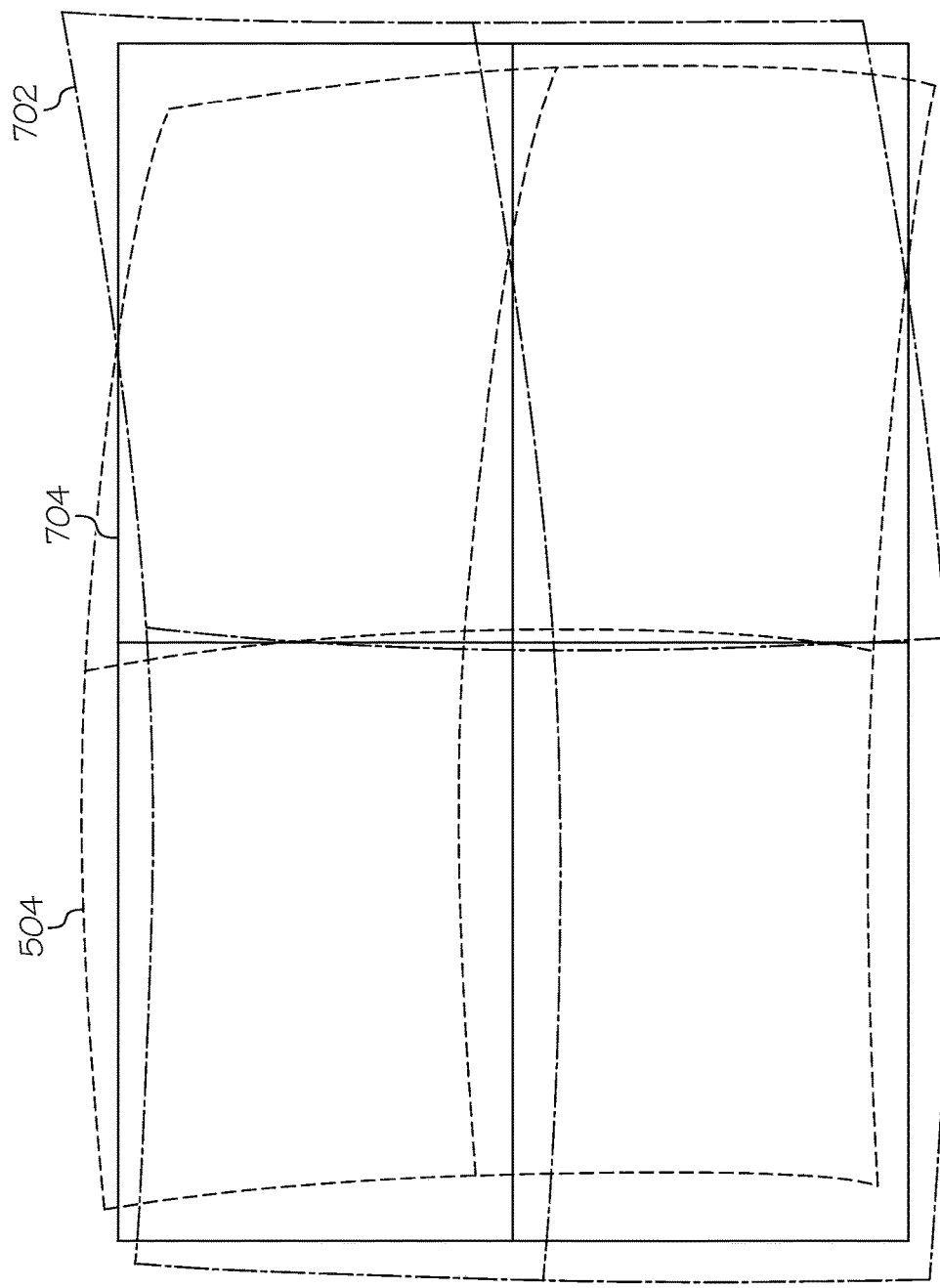

The system 100 described herein resolves these above-described disparities by separately applying appropriate but distinctly different geometric correction factors (e.g., pre-distortion or warping) to the right and left image data such that both will overlay each other with preferably zero dipvergence and with the desired degree of convergence. This functionality is illustrated more clearly in FIGS. 6 and 7. In particular, FIG. 6 depicts the pre-distorted right-eye image 602, the distorted image 502, and the resulting nominal image 604 that would be seen from eyebox 108 through the right shutters 227a and 227b, and FIG. 7 depicts the pre-distorted left-eye image 702, the distorted image 504, and the resulting nominal image 704 that would be seen from eyebox 108 through the left shutters 228a and 228b. As FIGS. 6 and 7 clearly depict, the resulting nominal images 604, 704 are non-distorted and correspond to the rectilinear grid 402.

The image pre-distortion or warping electronics can take many different forms as well as different inputs. In one embodiment it is a straightforward warping engine, but where the warping equation coefficients are mapped from a lookup table, and depend upon the measured spatial coordinates of nominal or dynamically tracked eye pupils. In another embodiment, the mapping could include flight-dependent parameters such as altitude, airspeed, differential pressure and so forth. This would allow the mapping to compensate (if a correction database were provided) for any slight deformation of the windscreen or other combiner surface(s).

In the case of a feature which is desired to appear at a great distance away from a viewer (e.g., analogous to being fully collimated), the convergence is further adjusted to zero (e.g., parallel rays) by adjusting the effective lateral separation of the distortion compensated nominal images 602 and 702 to preferably match the inter-pupillary distance (IPD) of the viewer. In this way, the perceived binocular location will be at a far distance. The location of a feature may also be adjusted to be conformal with a feature or object that is not part of the image being displayed but can be seen within the field of view, such as through the windscreen 104 or in front of the windscreen 104. This is accomplished by shifting the displayed feature and optionally adjusting the final convergence as seen by the viewer, but at the same time keeping dipvergence seen by the viewer to a minimum, preferably zero. In this manner, each eye will see the displayed feature as aligned with the corresponding non-image feature or object, and this conformality can be established whether the object is distant or near provided the appropriate degree of convergence is provided.

Returning once again to FIG. 1, the windscreen 104, which functions as a combiner, is preferably a conventional windscreen that is installed in a vehicle, such as various types of aircraft, various types of land craft (e.g., an automobile), or various types of watercraft. As such, the windscreen 104 may not exhibit optimal optical characteristics, although such optimization is optional and can improve overall performance. However, the optical characteristics of the windscreen 104 have been measured, and these characteristics are preferably stored in the image generator 114. In this way, the right eye and the left eye image 106 are presented and viewed based not only on the desired image content, but also on the optical characteristics of the windscreen 104 and any optional collimation or correction optics that may be present. Moreover, the windscreen 104 may not be symmetric, with respect to the location of the eyebox 108. It will be appreciated that the disclosed system 100 and method could also be implemented with various alternate combiner elements (e.g., non-windscreen) in which such correction would simplify the optical requirements relative to a precision-designed optical system.

In some embodiments, the system 100 may be configured to actively compensate the images for slight deformations of the windscreen 104. For example, in one embodiment, the system 100 may additionally include one or more windscreen sensors 118 (e.g., 118-1, 118-2, 118-3 . . . 118-N). Each windscreen sensor 118 is configured to sense one or more parameters representative of the optical characteristics of the windscreen 104, and supply parameter signals representative thereof to the image generators 114. It will be appreciated that the number of windscreen sensors 118 may vary. It will additionally be appreciated that each sensor may be variously configured and implemented to sense various parameters of the windscreen 104 that may impact its optical characteristics. For example, the windscreen sensors 118 may sense windscreen deformation, shifting, or temperature, just to name a few. It will be appreciated that the windscreen sensors 118 may be disposed in contact with, or remote from, the windscreen 104. As one example of the latter, a light source may be directed toward the windscreen 104, and the reflected light may be monitored by a sensor to detect deformation of the windscreen 104.

Regardless of the number and type of parameters that are sensed, the projector 102, and more specifically each image generator 114, is further configured, in response to the parameter signals, to determine the optical characteristics of the windscreen 104. The image generators 114, based on the determined optical characteristics, compensate the generated right eye and left eye image 106 for any variations in the optical characteristics of the windscreen 104.

In another embodiment, the system 100 may instead (or additionally) include an avionics data source 122. The avionics data source 122, which may be implemented using individual sensors, individual systems or subsystems, or as a single system, is configured to supply avionics data representative of one or more avionics parameters. The avionics parameters may vary, but are preferably parameters that may impact the optical characteristics of the windscreen 104. Some non-limiting examples of such avionics parameters include altitude, airspeed, and differential pressure, just to name a few.

Again, regardless of the number and type of avionics data that are supplied by the avionics data source, the projector 102, and more specifically each image generator 114, is further configured, in response to the avionics data, to determine the optical characteristics of the windscreen 104. The image generators 114, based on the determined optical characteristics, compensate the generated right eye and left eye image 106 for any variations in the optical characteristics of the windscreen 104.

The system 100 may be configured such that the eyebox 108 is stationary or dynamic. As may be appreciated, for the embodiments in which the eyebox 108 is not movable, the range of useful head motion from which the display could be seen is limited. In some of these embodiments, the eyebox 108 remains fixed in its locations, but the image content that is displayed is dynamically adjusted based on the location of the eyes within the eyebox 108. In these embodiments, the location of the eyes, and more specifically the location of the pupil of each eye, is determined, and image compensation, such as distortion correction in conjunction with image shuttering, is actively applied for each field or frame of each image, based on the determined pupil location.

In other embodiments, the location of the eyebox 108 is dynamically repositioned to follow the location of the head and eyes. Thus, both the image distortion and the location of the eyebox 108 can vary with the locations of the right eye and left eye of the viewer. In dynamic embodiments such as described here and in the previous paragraph, and as FIG. 1 further depicts, the system may preferably include a pupil location tracker 124. The pupil location tracker 124 is configured to sense the locations of the right eye and the left eye of a viewer, and to supply eye location signals representative of each eye location to the image generators 114. It should be noted that the pupil location tracker 124 is not necessarily configured to sense and determine the direction in which the viewer may be looking Rather, it is configured to sense the three-dimensional location of the right and left eyes of the viewer.

The pupil location tracker 124 may be implemented using any one of numerous known head and/or eye tracking schemes. In one embodiment, a dual camera system is used. In this exemplary system, each camera and associated image analysis algorithm detects the location of each eye pupil in the respective camera image. The true spatial position of each eye is then determined via triangulation or similar analysis of the image pair. It will additionally be appreciated that the eyebox 108 may optionally be dynamically repositioned, but that the viewability of the right and left eye images by the inappropriate eye remains precluded by eyewear 200.

This system and method described herein is implemented using relatively simple HUD optics while actively maintaining minimal vergence errors, especially minimal dipvergence errors, as well as high conformality if desired. In particular, by implementing active compensation, the optical requirements for the projected eyebox are greatly simplified, which allows the use of compact and low cost optics. In particular, the required degree of image collimation by any optional additional optics may be significantly reduced or potentially eliminated.

Figure 3:
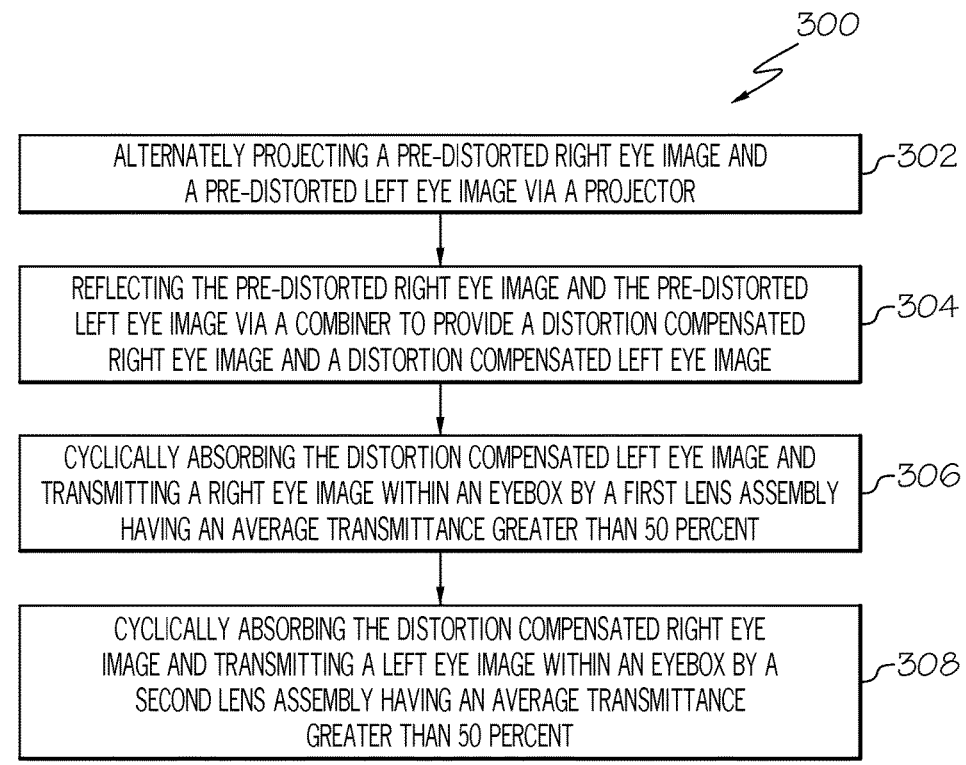
FIG. 3 is a flow chart of a method for shuttering eyewear in accordance with the exemplary embodiment.

FIG. 3 is a flow chart that illustrates an exemplary embodiment of a method 300 suitable for use with a flight deck display system 100. Method 300 represents one implementation of a method for displaying aircraft approaches or departures on an onboard display of a host aircraft. The various tasks performed in connection with method 300 may be performed by software, hardware, firmware, or any combination thereof. For illustrative purposes, the following description of method 300 may refer to elements mentioned above in connection with preceding FIGS. In practice, portions of method 300 may be performed by different elements of the described system, e.g., a processor, a display element, or a data communication component. It should be appreciated that method 300 may include any number of additional or alternative tasks, the tasks shown in FIG. 3 need not be performed in the illustrated order, and method 300 may be incorporated into a more comprehensive procedure or method having additional functionality not described in detail herein. Moreover, one or more of the tasks shown in FIG. 3 could be omitted from an embodiment of the method 300 as long as the intended overall functionality remains intact.

In accordance with the exemplary method of FIG. 3, a method of viewing a conformal-capable display image comprises alternately projecting 302 a pre-distorted right eye image and a pre-distorted left eye image via a projector; reflecting 304 the pre-distorted right eye image and the pre-distorted left eye image via a combiner to provide a distortion compensated right eye image and a distortion compensated left eye image; cyclically absorbing 306 the distortion compensated left eye image and transmitting the distortion compensated right eye image within an eyebox by a first lens assembly having an average transmittance greater than 50 percent; and cyclically absorbing 308 the distortion compensated right eye image and transmitting the distortion compensated left eye image within the eyebox by a second lens assembly having an average transmittance greater than 50 percent.

Figure 8:
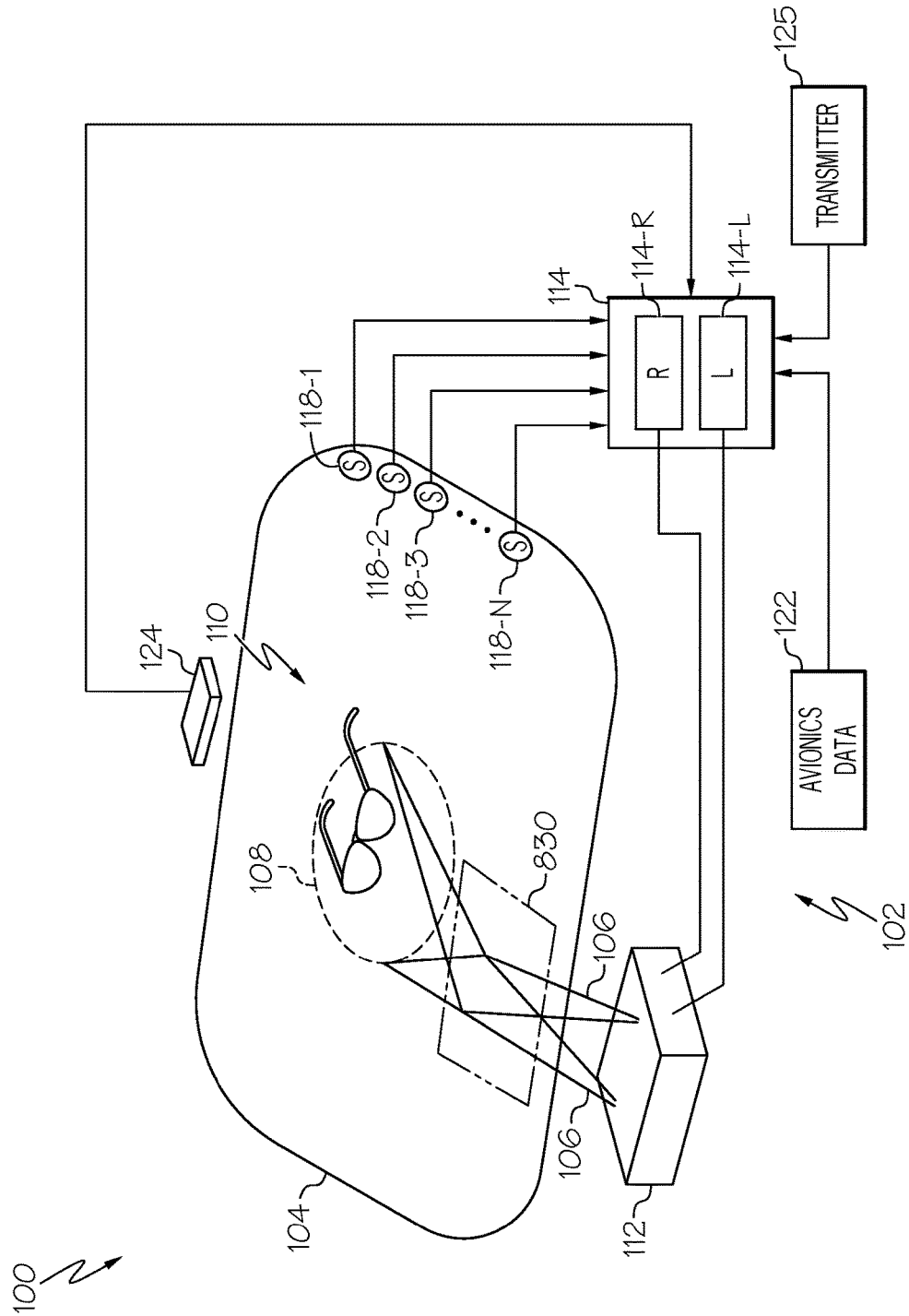
FIG. 8 is a functional block diagram of another embodiment of a conformal-capable head-up display system.

A further exemplary embodiment is depicted in FIG. 8. This is very similar to the embodiment of FIG. 1, except that in this case windscreen/combiner 104 includes an additional optical characteristic that allows it to serve effectively as a transparent projection screen. In the embodiment shown, projection unit 112 projects a focused image onto an applied or otherwise incorporated film 830 that diffusely scatters or re-emits that focused image to eyebox 108, but remains substantially transparent to light from the forward scene. Examples of substantially transparent projection screens are known in the art, and include but are not limited to holographic screens, fluorescent screens and electro-optically controlled scattering structures. This embodiment otherwise functions similarly to the embodiment of FIG. 1, with the exception that the apparent accommodation (focus) distance is located in the proximity of the windscreen 104.

Figure 9:
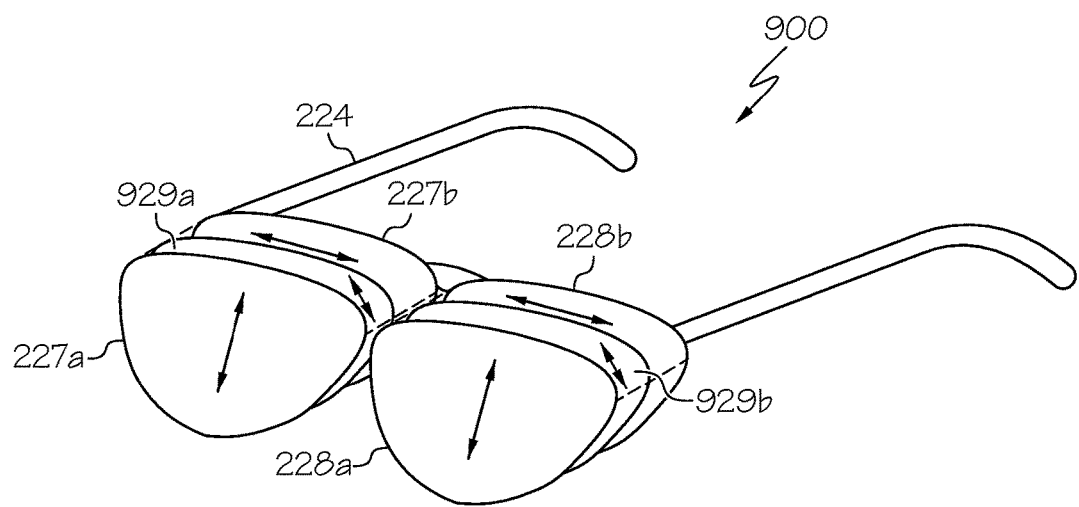
FIG. 9 is a diagram of shutter eyewear in accordance with a second exemplary embodiment.

Yet another exemplary embodiment is shown in FIG. 9. This embodiment builds upon a configuration alluded to above, in that it combines the switchable polarizers with a switchable retardation layer 929a, 929b to yield a dual-mode shutter eyewear 900 which further enhances the ability for increased average transmittance. In the eyewear 900 of FIG. 9, the switchable retardation layer 929a is added between the switchable polarizers 227a and 227b, and the switchable retardation layer 929b is added between the switchable polarizers 228a and 228b. While numerous variations are possible, the retardation layer 929a, 929b of the depicted embodiment is assumed to be a conventional pi-cell (OCB) which is switchable between a nominal half-wave retardance and zero retardance. By orienting the retardation axis at 45 degrees between the two polarizer axes, the nominal transmittance of the active polarizers can be increased.

Figure 10:
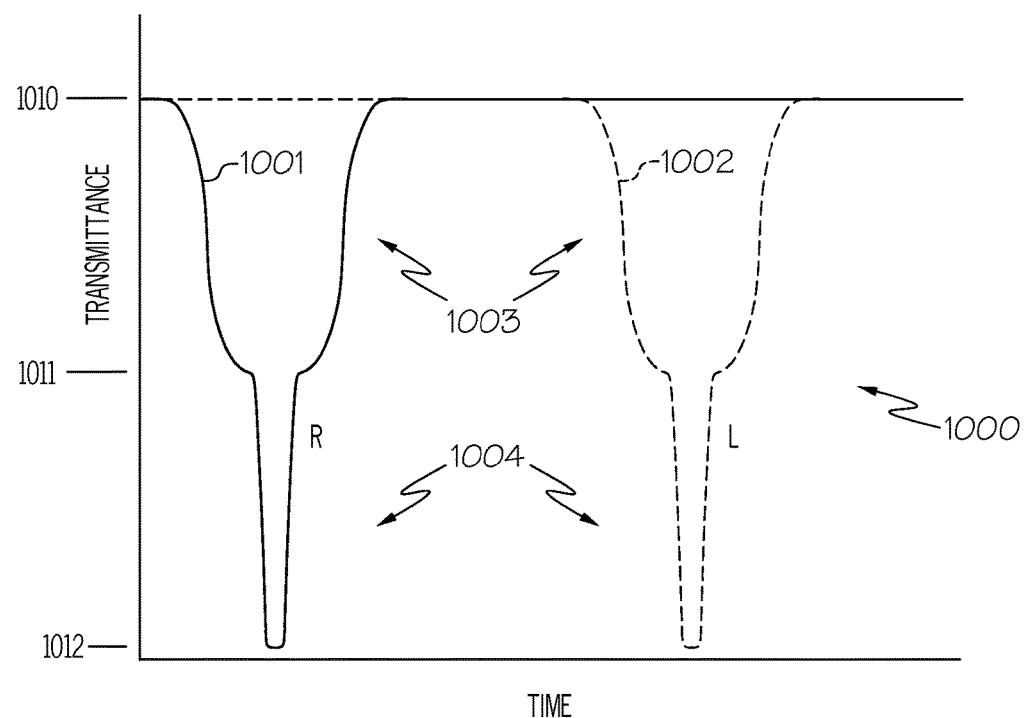
FIG. 10 is a graph of transmittance versus time for the second exemplary embodiment of FIG. 9.

Referring to FIG. 10, the transmittance versus time for the right lens 1001 and the left lens 1002 are plotted. Transmittance 1010 represents the transmittance when the switchable polarizers are not activated, and is preferably nearly clear or transparent, though some minor absorptive and reflective losses may be unavoidable. Prior to projecting the left image, the switchable polarizers of the right lens are activated 1003, which reduces transmittance 1001 to a mid-level transmittance 1011. Once the right lens polarizers reach this acceptable activation level, the right retarder is switched from half-wave to zero retardance 1004, which reduces the transmittance of the right lens to nearly zero transmittance 1012. It is during this dark window period of the right eye that the left image is presented. The sequence is then reversed such that the retarder returns to half-wave, and the polarizers become inactive. A similar sequence is then applied to modulate the transmittance 1002 of the left lens, and the right image is presented when the left lens transmittance is nearly zero. Note that at the times the right and left images are presented as described, the right and left lens transmittances, respectively, are very high.

This combining of the two, e.g. dual-mode, mechanisms allows further optimization of the switching speed and average transmittance tradeoffs. In particular, this dual-mode approach is beneficial if the switching speed of the switchable polarizers alone cannot achieve or match the established switching speed of a compatible switchable retarder mechanism. While the retarder in this exemplary embodiment is a pi-cell, another even faster switchable retarder can be substituted if and when available. For example, solid state retardation mechanisms can switch even faster than liquid crystal configurations, though practical limitations and possibly voltage requirements may preclude their use.

Those of skill in the art will appreciate that the various illustrative logical blocks, modules, circuits, and algorithm steps described in connection with the embodiments disclosed herein may be implemented as electronic hardware, computer software, or combinations of both. Some of the embodiments and implementations are described above in terms of functional and/or logical block components (or modules) and various processing steps. However, it should be appreciated that such block components (or modules) may be realized by any number of hardware, software, and/or firmware components configured to perform the specified functions. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present invention. For example, an embodiment of a system or a component may employ various integrated circuit components, e.g., memory elements, digital signal processing elements, logic elements, look-up tables, or the like, which may carry out a variety of functions under the control of one or more microprocessors or other control devices. In addition, those skilled in the art will appreciate that embodiments described herein are merely exemplary implementations.

The various illustrative logical blocks, modules, and circuits described in connection with the embodiments disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The steps of a method or algorithm described in connection with the embodiments disclosed herein may be embodied directly in hardware, in a software module executed by a processor, or in a combination of the two. A software module may reside in RAM memory, flash memory, ROM memory, EPROM memory, EEPROM memory, registers, hard disk, a removable disk, a CD-ROM, or any other form of storage medium known in the art. An exemplary storage medium is coupled to the processor such that the processor can read information from, and write information to, the storage medium. In the alternative, the storage medium may be integral to the processor. The processor and the storage medium may reside in an ASIC. The ASIC may reside in a user terminal. In the alternative, the processor and the storage medium may reside as discrete components in a user terminal.

In this document, relational terms such as first and second, and the like may be used solely to distinguish one entity or action from another entity or action without necessarily requiring or implying any actual such relationship or order between such entities or actions. Numerical ordinals such as "first," "second," "third," etc. simply denote different singles of a plurality and do not imply any order or sequence unless specifically defined by the claim language. The sequence of the text in any of the claims does not imply that process steps must be performed in a temporal or logical order according to such sequence unless it is specifically defined by the language of the claim. The process steps may be interchanged in any order without departing from the scope of the invention as long as such an interchange does not contradict the claim language and is not logically nonsensical.

Further, unless explicitly stated otherwise, each numerical value and range described and/or illustrated herein should be interpreted as being approximate as if the word "about" or "approximately" preceded the value of the value or range.

The preceding description refers to elements or nodes or features being "coupled" together. As used herein, unless expressly stated otherwise, "coupled" means that one element/node/feature is directly or indirectly joined to (or directly or indirectly communicates with) another element/node/feature, and not necessarily mechanically. Thus, although the drawings may depict one exemplary arrangement of elements, additional intervening elements, devices, features, or components may be present in an embodiment of the depicted subject matter. In addition, certain terminology may also be used in the following description for the purpose of reference only, and thus are not intended to be limiting.

Benefits, other advantages, and solutions to problems have been described above with regard to specific embodiments. However, the benefits, advantages, solutions to problems, and any element(s) that may cause any benefit, advantage, or solution to occur or become more pronounced are not to be construed as a critical, required, or essential feature or element of any or all the claims. As used herein, the terms "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus.

While at least one exemplary embodiment has been presented in the foregoing detailed description of the invention, it should be appreciated that a vast number of variations exist. It should also be appreciated that the exemplary embodiment or exemplary embodiments are only examples, and are not intended to limit the scope, applicability, or configuration of the invention in any way. Rather, the foregoing detailed description will provide those skilled in the art with a convenient road map for implementing an exemplary embodiment of the invention. It being understood that various changes may be made in the function and arrangement of elements described in an exemplary embodiment without departing from the scope of the invention as set forth in the appended claims.

What is claimed is:

1. An optical device for displaying a pulsed right eye display image and a pulsed left eye display image over a forward scene that is observable through a windscreen, comprising:
   a first lens assembly having a transmittance versus time and configured to optically receive the pulsed right eye image and the pulsed left eye image and to cycle between absorbing the pulsed left eye image and transmitting the pulsed right eye image;
   a second lens assembly having a transmittance versus time and configured to optically receive the pulsed right eye image and the pulsed left eye image and to cycle between absorbing the pulsed right eye image and transmitting the pulsed left eye image;
   wherein the first and second lens assemblies comprise crossed dichroic guest-host liquid crystal lenses;
   wherein each lens assembly includes a switchable retardation layer that is located between two switchable polarizers, wherein the switchable retardation layer is switchable between a nominal half-wave retardance and zero retardance and where a retardation axis of the retardation layer is oriented at 45 degrees between axes of two switchable polarizers to increase transmittance of the lens assembly; and
   wherein the first lens assembly having a transmittance versus time has an average transmittance greater than 50 percent, and the second lens assembly having a transmittance versus time has an average transmittance greater than 50 percent.

2. The optical device of claim 1 wherein the average transmittance through the first and second lens assemblies is greater than 75 percent.

3. The optical device of claim 1, further comprising:
   an image generator configured to apply geometric correction factors to generate a geometrically warped pulsed right eye image and a geometrically warped pulsed left eye image;
   a combiner positioned to reflect the geometrically warped pulsed right eye image and generate a distortion compensated pulsed right eye image and the geometrically warped pulsed left eye image and generate a distortion compensated pulsed left eye image and to:
   (i) to supply a reflected distortion compensated pulsed right eye image to an eyebox as the pulsed right eye image; and
   (ii) to supply a reflected distortion compensated pulsed left eye image to the eyebox as the pulsed left eye image.

4. The optical device of claim 1 wherein the first lens assembly comprises:
   a first right shuttered eyewear lens;
   a second right shuttered eyewear lens, wherein the first and second right eye shuttered eyewear lenses cyclically absorb the pulsed left eye image and transmit the pulsed right eye image;
   and further wherein the second eyewear lens assembly comprises:
   a first left shuttered eyewear lens; and
   a second left shuttered eyewear lens, wherein the first and second left shuttered eyewear lenses cyclically absorb the pulsed right eye image and transmit the pulsed left eye image.

5. The optical device of claim 3, wherein:
   the combiner is a vehicle windscreen.

6. The optical device of claim 5, further comprising:
   at least one windscreen sensor associated with the vehicle windscreen, each windscreen sensor configured to sense at least one parameter representative of the optical characteristics of the windscreen and supply parameter signals representative thereof to the image generator,
   wherein the image generator is further configured, in response to the parameter signals, warped pulsed right eye image and the geometrically warped pulsed left eye image.

7. The optical device of claim 5, further comprising:
   an avionics data source configured to supply avionics data representative of one or more avionics parameters to the image generator,
   wherein the image generator is further configured, in response to the avionics data, to determine the one or more optical characteristics of the windscreen for creating the geometrically warped pulsed right eye image and the geometrically warped pulsed left eye image.

8. The optical device of claim 1, further comprising:
   an image generator configured to apply geometric correction factors to generate a geometrically warped pulsed right eye image and a geometrically warped pulsed left eye image;
   a pupil location tracker configured to sense locations of a right eye and a left eye of a viewer, the pupil tracker further configured to supply eye location signals representative of each eye location to the image generator,
   wherein the image generator is responsive to the location signals to selectively and individually compensate each frame of the geometrically warped pulsed right eye image and the geometrically warped pulsed left eye image to vary with the locations of the right eye and left eye, respectively, of the viewer.

9. An optical device included within a head-up display system, the optical device comprising:
   an image generator configured to apply geometric correction factors to generate a geometrically warped pulsed right eye image and a geometrically warped pulsed left eye image, where the geometrically warped pulsed right eye and left eye images will form a head up display image over a forward scene that is observable through a windscreen;
   a combiner positioned to reflect the geometrically warped pulsed right eye image to supply a distortion compensated pulsed right eye image to an eyebox and to reflect the geometrically warped pulsed left eye image to supply a distortion compensated pulsed left eye image to the eyebox;
   right eyewear having an average transmittance greater than 50 percent and configured to be cycled between absorbing and transmitting, and receiving the distortion compensated pulsed right eye image and the distortion compensated pulsed left eye image when positioned within the eyebox, and cycled to provide a pulsed right eye image during a first time period and to block the pulsed left eye image during a second time period;

left eyewear configured to be cycled between absorbing and transmitting, and receiving the distortion compensated pulsed right eye image and the distortion compensated pulsed left eye image when positioned within the eyebox, and cycled to provide a pulsed left eye image during the second time period and to block the pulsed right eye image during the first time period;

wherein the right and left eyewear comprise crossed dichroic guest-host liquid crystal lenses;

wherein each eyewear includes a switchable retardation layer that is located between two switchable polarizers, wherein the switchable retardation layer is switchable between a nominal half-wave retardance and zero retardance and where a retardation axis of the retardation layer is oriented at 45 degrees between axes of two switchable polarizers to increase transmittance of the eyewear; and wherein an averaged transmittance over the first and second time periods of the forward scene is greater than 50 percent.

10. The optical device of claim 9 wherein the averaged transmittance over a full cycle of the first and second time periods is greater than 75 percent.

11. The optical device of claim 9 wherein the right eyewear comprises:
a first right shuttered eyewear lens;
a second right shuttered eyewear lens, wherein the first and second right shuttered eyewear lenses cyclically absorb the pulsed left eye image and transmit the pulsed right eye image;
and the left eyewear comprises:
a first left shuttered eyewear lens; and
a second left shuttered eyewear lens, wherein the first and second left shuttered eyewear lenses cyclically absorb the pulsed right eye image and transmit the pulsed left eye image.

12. The optical device of claim 9, wherein:
the combiner is a vehicle windscreen.

13. The optical device of claim 12, further comprising:
one or more windscreen sensors associated with the windscreen, each windscreen sensor configured to sense one or more parameters representative of the optical characteristics of the windscreen and supply parameter signals representative thereof to the image generator,
wherein the image generator is further configured, in response to the parameter signals, to determine the one or more optical characteristics of the windscreen for creating the geometrically warped pulsed right and left images.

14. The optical device of claim 12, further comprising:
an avionics data source configured to supply avionics data representative of one or more avionics parameters to the projector,
wherein the image generator is further configured, in response to the avionics data, to determine the one or more optical characteristics of the windscreen for creating the geometrically warped pulsed right and left images.

15. The optical device of claim 9, further comprising:
a pupil location tracker configured to sense locations of a right eye and a left eye of a viewer, the pupil tracker further configured to supply eye location signals representative of each eye location to the image generator,
wherein the image generator is responsive to the location signals to selectively and individually compensate each frame of the pulsed right eye image and the pulsed left eye image to vary with the locations of the right eye and left eye, respectively, of the viewer.

16. A method of viewing a conformal-capable display image, comprising the steps of:
alternately projecting a geometrically warped pulsed right eye image and a geometrically warped pulsed left eye image via a projector;
reflecting the geometrically warped pulsed right eye image and the geometrically warped pulsed left eye image via a combiner to provide a distortion compensated pulsed right eye image and a distortion compensated pulsed left eye image, where the geometrically warped pulsed right eye image and pulsed left eye image will form a head up display image over a conformal-capable display image that is observable through a windscreen;
cyclically absorbing the distortion compensated pulsed left eye image and transmitting a pulsed right eye image within an eyebox by a first eyewear lens assembly; and
cyclically absorbing the distortion compensated pulsed right eye image and transmitting a pulsed left eye image within the eyebox by a second eyewear lens assembly;
wherein the first and second eyewear lens assemblies comprise crossed dichroic guest-host liquid crystal lenses;
wherein each eyewear lens assembly includes a switchable retardation layer that is located between two switchable polarizers, wherein the switchable retardation layer is switchable between a nominal half-wave retardance and zero retardance and where a retardation axis of the retardation layer is oriented at 45 degrees between axes of two switchable polarizers to increase transmittance of the eyewear lens assembly; and
wherein a time averaged transmittance of the conformal-capable display image is greater than 50 percent over a full cycle of the first and second eyewear lens assemblies, where the conformal-capable display image is formed by temporally multiplexing the pulsed right eye image and the pulsed left eye image while simultaneously blocking an inappropriate image for the right eye and the left eye so that the head up display image is observable over the conformal-capable display image.

17. The method of claim 16 wherein the time averaged transmittance of the conformal-capable display image through both the first and second eyewear lens assemblies over a full cycle of both the first and second eyewear lens assemblies is greater than 75 percent.

18. The method of claim 16, further comprising:
reflecting the geometrically warped pulsed right eye image and the geometrically warped pulsed left eye image and to (i) to supply the reflected warped pulsed right eye image to the eyebox as a distortion-compensated pulsed right eye image and (ii) to supply the reflected warped pulsed left eye image to the eyebox as a distortion-compensated pulsed left eye image via a combiner.

19. The method of claim 18, further comprising:
sensing by a sensor one or more parameters representative of the optical characteristics of the combiner and supply parameter signals representative thereof to an image generator,
determining by the image generator the one or more optical characteristics of the combiner for creating the pulsed right eye image and the pulsed left eye image.

20. The method of claim 18, further comprising:
supplying by an avionics system avionics data representative of one or more avionics parameters to an image generator,
determining by the image generator the one or more optical characteristics of the combiner in response to the avionics data for creating the geometrically warped pulsed right and pulsed left eye images.

21. The method of claim 16, further comprising:
sensing via a pupil locator locations of a right eye and a left eye of a viewer;
providing eye location signals representative of each eye location to an image generator,
compensating the pulsed right eye image and the pulsed left eye image to vary with the locations of the right eye and left eye, respectively, of the viewer.

22. An optical device comprising:
right eyewear configured to be cycled between absorbing and transmitting, and receiving a pulsed right eye image and a pulsed left eye image when positioned within an eyebox, and cycled with an average transmittance of greater than 50 percent to provide the pulsed right eye image during a first time period and to block the pulsed left eye image during a second time period;
left eyewear configured to be cycled between absorbing and transmitting, and receiving the pulsed right eye image and the pulsed left eye image when positioned within the eyebox, and cycled with an average transmittance of greater than 50 percent to provide the pulsed left eye image during the second time period and to block the pulsed right eye image during the first time period;
wherein the right and left eyewear comprise crossed dichroic guest-host liquid crystal lenses;
wherein each eyewear includes a switchable retardation layer that is located between two switchable polarizers, wherein the switchable retardation layer is switchable between a nominal half-wave retardance and zero retardance and where a retardation axis of the retardation layer is oriented at 45 degrees between axes of two switchable polarizers to increase transmittance of the eyewear; and
wherein a displayed image is formed over a forward scene that is observable through a windscreen by temporally multiplexing the pulsed right eye image and the pulsed left eye image while simultaneously blocking an inappropriate image for the right eye and the left eye so that the forward scene is observable through a head up display image.

* * * * *